United States Patent
Wang et al.

(10) Patent No.: US 12,429,604 B2
(45) Date of Patent: Sep. 30, 2025

(54) METHODS AND APPARATUS FOR CARRIER PHASE CONTINUITY IN SATELLITE POSITIONING SYSTEM SIGNALS

(71) Applicant: QUALCOMM Incorporated, San Diego, CA (US)

(72) Inventors: Min Wang, Tustin, CA (US); Ning Luo, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 370 days.

(21) Appl. No.: 17/698,731

(22) Filed: Mar. 18, 2022

(65) Prior Publication Data

US 2023/0296792 A1    Sep. 21, 2023

(51) Int. Cl.
   *G01S 19/43*       (2010.01)
(52) U.S. Cl.
   CPC .................. *G01S 19/43* (2013.01)
(58) Field of Classification Search
   CPC .............................................. G01S 19/43-44
   See application file for complete search history.

(56) References Cited

U.S. PATENT DOCUMENTS

| 2011/0267226 A1 | 11/2011 | Talbot et al. |
| 2017/0269231 A1 | 9/2017 | Dai et al. |
| 2018/0074206 A1 | 3/2018 | Niesen et al. |
| 2019/0391274 A1* | 12/2019 | Chen ................ G01S 19/44 |
| 2021/0255336 A1* | 8/2021 | Noble ............... G01S 19/44 |

OTHER PUBLICATIONS

Navipedia, RTK Fundamentals, https://gssc.esa.int/navipedia/index.php?title=RTK_Fundamentals (Year: 2011).*
J. Van Sickle et al., Differencing—GPS and GNSS for Geospatial Professionals, https://www.e-education.psu.edu/geog862/node/1727 (Year: 2023).*
International Search Report and Written Opinion—PCT/US2023/061245—ISA/EPO—May 11, 2023.

* cited by examiner

*Primary Examiner* — Robert W Hodge
*Assistant Examiner* — Fred H Mull
(74) *Attorney, Agent, or Firm* — Thien T. Nguyen (57) ABSTRACT

A mobile device supports carrier phase based positioning using positioning signals received from positioning signals from a plurality of satellites in a satellite positioning system (SPS). In the presence of a discontinuous carrier phase, e.g., if a cycle slip is detected, the mobile device is configured to generate a continuous carrier phase using the device history of the mobile device. The mobile device, for example, may track the carrier phase of positioning signals and determine a position estimate for the mobile device at a first time. If a cycle clip of the carrier phase is detected at a second time, the mobile device resolves the integer ambiguity in the carrier phase at the second time based on the carrier phase and position estimate for the mobile device from the first time.

20 Claims, 8 Drawing Sheets

FIG. 11

METHODS AND APPARATUS FOR CARRIER PHASE CONTINUITY IN SATELLITE POSITIONING SYSTEM SIGNALS

BACKGROUND OF THE DISCLOSURE

1. Field of the Disclosure

Aspects of the disclosure relate generally to wireless communications and positioning, and in particular to positioning of a mobile device using carrier phase in positioning signals.

2. Description of the Related Art

A receiver for Satellite Positioning Systems (SPS) and a transceiver for wireless communication systems are often embedded in a mobile device, such as a mobile phone, a wearable device, a laptop computer, an Internet of Thing (IoT) device, etc. SPS, for example, may include Global Navigation Satellite Systems (GNSS), such as Global Positioning System (GPS), while wireless communication systems include, e.g., terrestrial Wireless Wide Area Networks (WWAN), such as Long-Term Evolution (LTE) or Fifth Generation New Radio (5G NR), non-terrestrial WWANs, e.g., satellite communication systems, and Wireless Local Area Networks (WLAN), such as Wi-Fi. The SPS receiver may receive SPS signals from satellite vehicles and provide the SPS signals to a positioning operation. Estimating carrier phase (CP) of positioning signals received from satellite vehicles (SVs) may be an important part of such SPS positioning operations. However, for a variety of reasons, such as cycle slips, interference caused by other signals, or power cycling of circuits in the mobile device for receiving the positioning signals, continuity of the CP estimation may be impaired. As such, there is need for improvement in the field of wireless communication devices to improve estimation of CP in positioning signals received from SVs.

SUMMARY

A mobile device supports carrier phase based positioning using positioning signals received from positioning signals from a plurality of satellites in a satellite positioning system (SPS). In the presence of a discontinuous carrier phase, e.g., if a cycle slip is detected, the mobile device is configured to generate a continuous carrier phase using the device history of the mobile device. The mobile device, for example, may track the carrier phase of positioning signals and determine a position estimate for the mobile device at a first time. If a cycle clip of the carrier phase is detected at a second time, the mobile device resolves the integer ambiguity in the carrier phase at the second time based on the carrier phase and position estimate for the mobile device from the first time. By way of example, a carrier phase correction may be generated based on the carrier phase and estimated position from the first time, and an ambiguity offset may be generated based on the carrier phase correction and the discontinuous carrier phase at the second time. A continuous carrier phase at the second time may be generated based on the ambiguity offset and the discontinuous carrier phase at the second time.

In one implementation, a method for supporting satellite positioning system (SPS) operation performed by a mobile device, the method includes receiving positioning signals from a plurality of satellite vehicles (SVs); tracking a carrier phase (CP) for each of the positioning signals at a first time; estimating a position of the mobile device at the first time; determining a cycle slip in the CP at a second time; and resolving an integer ambiguity in the CP at the second time based on the CP at the first time and the position of the mobile device at the first time.

In one implementation, a mobile device configured for supporting satellite positioning system (SPS) operation, includes a wireless transceiver configured to wirelessly communicate with network entities; a satellite positioning system (SPS) receiver configured to wireless receive positioning signals from positioning satellites; at least one memory; and at least one processor coupled to the wireless transceiver, the SPS receiver, and the at least one memory, the at least one processor configured to: receive, via the SPS receiver, positioning signals from a plurality of satellite vehicles (SVs); track a carrier phase (CP) for each of the positioning signals at a first time; estimate a position of the mobile device at the first time; determine a cycle slip in the CP at a second time; and resolve an integer ambiguity in the CP at the second time based on the CP at the first time and the position of the mobile device at the first time.

In one implementation, a mobile device configured for supporting satellite positioning system (SPS) operation, includes means for receiving positioning signals from a plurality of satellite vehicles (SVs); means for tracking a carrier phase (CP) for each of the positioning signals at a first time; means for estimating a position of the mobile device at the first time; means for determining a cycle slip in the CP at a second time; and means for resolving an integer ambiguity in the CP at the second time based on the CP at the first time and the position of the mobile device at the first time.

In one implementation, a non-transitory storage medium including program code stored thereon, the program code is operable to configure at least one processor in a mobile device for supporting satellite positioning system (SPS) operation, the program code comprising instructions to: receive positioning signals from a plurality of satellite vehicles (SVs); track a carrier phase (CP) for each of the positioning signals at a first time; estimate a position of the mobile device at the first time; determine a cycle slip in the CP at a second time; and resolve an integer ambiguity in the CP at the second time based on the CP at the first time and the position of the mobile device at the first time.

BRIEF DESCRIPTION OF THE DRAWINGS

Aspects of the disclosure are illustrated by way of example. In the accompanying figures, like reference numbers indicate similar elements.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used, and various modifications may be made without departing from the scope of the disclosure or the spirit of the appended claims.

Satellite Positioning System (SPS) receivers and wireless transmitters, such as Wireless Wide Area Network (WWAN) and Wireless Local Area Network (WLAN) transmitters, are often embedded in a mobile device, such as a mobile phone, a wearable device, a laptop computer, an Internet of Thing (IoT) device, or a semiautonomous or autonomous vehicle, such as a ground vehicle, i.e., a self-driving car or truck, or an aerial vehicle, such as a unmanned aerial vehicle (UAV) sometimes referred to as a drone, etc. The SPS receiver may receive SPS signals from satellite vehicles and performs positioning operations based on the received SPS signals. The SPS receiver may support different global or regional positioning systems, such as Global Positioning System (GPS) signals, GLOobal NAvigation Satellite System (GLONASS) signals, Galileo (GAL) signals, BeiDou (BDS) signals, and/or signals of other type of satellite positioning system.

The wireless transmitter transmits and receives wireless signals for various communication operations, including data and control. A WWAN transmitter may support various communications systems including, for example, include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). Additionally, the WWAN transmitter may support non-terrestrial, e.g., satellite-based, communication systems. In some implementations, satellite-based communication systems may be combined with terrestrial wireless communications systems, such as 5G New Radio (NR) networks. In such a system, a mobile device may access a satellite, also referred to as a satellite vehicle (SV), instead of a terrestrial base station, which may connect to an earth station, also referred to as a ground station or non-terrestrial (NTN) gateway, which in turn may connect to a 5G network. A WLAN transmitter may support various communications systems including Wi-Fi, Long-Term Evolution (LTE) Direct, etc.

When supporting positioning operations, an SPS receiver may determine carrier phase (CP) of one or more positioning signals received from an SV in order to determine a position of the receiver. For example, such positioning signals may include one or more of a GPS L1 or L5 signal, a Galileo E1 or E5 signal, one or more BDS positioning signals, one or more QZSS positioning signals, and so on. A carrier-phase measurement is the measurement of the phase of a received continuous radio-frequency sinusoidal waveform. The CP is used to "carry" the pseudorandom noise ranging codes and any navigation messages. In CP positioning, the carrier of a positioning signal is recovered and the phase measured at regular intervals once a lock on the positioning signal is achieved. The pseudorandom noise ranging codes and any navigation messages that are carried by the CP may not be used during CP positioning.

The carrier phase may be tracked over time and used to determine the distance to a transmitter. With the distances known to multiple transmitters, and the positions of the transmitters known, the position of the receiver may be determined, using known positioning techniques, such as multilateration.

The distance to a transmitter, e.g., satellite vehicle, is a function of the carrier wavelength times the integer number of CP cycles plus a fractional CP cycle between the transmitter and the receiver. The integer number of CP cycles is the so-called integer ambiguity and may be resolved in a variety of ways. For example, techniques that may be used to resolve the integer ambiguity include using double difference carrier-phase measurements between pairs of satellites and pairs of receivers to determine relative receiver coordinates. Regardless of which technique is used to resolve the integer ambiguity problem, once resolved by continuously tracking the CP, the receiver may generate a continuous series of measurements CP cycle count, as long as there is no interruption in the CP tracking. For example, techniques such as Real Time Kinematics (RTK), precise point positioning (PPP), may use continuous tracking of the carrier phase.

Thus, with use of a CP that is continuously tracked, a more accurate position estimate may be derived with little delay. However, the measured CP may lose continuity, referred to herein as a cycle slip, for a variety of reasons.

For example, a mobile device may engage in power management operations, and may periodically power down one or more receiver circuits for receiving the positioning signals, resulting in a discontinuous CP. The mobile device, for example, loses a lock on the positioning signal when the one or more receiver circuits are powered down. When those receiver circuits are powered back on, there will be a gap in the measured CP, i.e., a cycle slip, which may result in undesirable delays in estimating the CP of the positioning signal.

In another example, a cycle slip may occur due to the receiver losing lock on the carrier of a positioning signal or due to blockage of reception of the positioning signal at the mobile device. The mobile device, by way of example, may be moved to a location where reception of the positioning signal is blocked, or the line of sight between the mobile and the transmitter may be blocked momentarily.

Disclosed herein are techniques for improving reception and determination of carrier phase in SPS receivers. For example, a mobile device may be used as a "virtual" base receiver, using a previous position of the mobile device and the measured CP at that position to help resolve the integer ambiguity at a later time after a CP cycle slip, e.g., based on a double difference between the "virtual" base receiver and a current position. The mobile device, for example, may track the CP for positioning signals from a plurality of satellite vehicles (SVs) and may estimate the position of the mobile device at a first time. After a cycle slip in the CP is detected, which may occur due to, e.g., power management, blockage conditions, etc., the mobile device may resolve the integer ambiguity in the CP at a second time based on the CP at the first time and the position of the mobile device at the first time.

Figure 1:
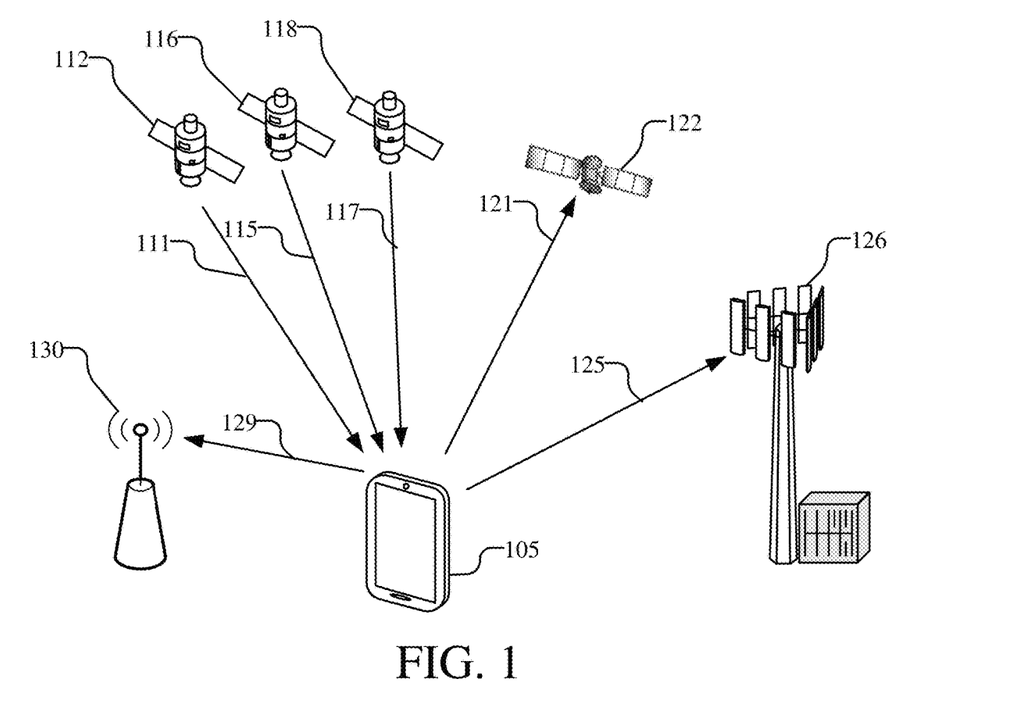
FIG. 1 illustrates a simplified diagram of a system in which a mobile device may receive SPS signals.

FIG. 1 illustrates a simplified diagram of a system 100 in which the mobile device 105 may receive SPS signals. The SPS signals can be transmitted based on various satellite position signaling standards, such as a GPS, GLONASS, GAL, BDS, and/or other type of satellite positioning system. A mobile device 105 can include a satellite positioning system (SPS) receiver that may be compatible with one or more of these satellite position signaling standards. The SPS receiver may process the SPS signals on one or more frequency bands based on the signaling standards to extract information and perform a position calculation operation based on the extracted information. For example, as part of this processing, the SPS receiver may determine and track the CP of one or more received SPS signals.

Mobile device 105 may be a device designed to perform numerous functions, including the ability to determine its own position based on the reception of SPS signals from satellites. Mobile device 105 is able to perform satellite-based positioning by receiving SPS signals from one or more satellites. As shown here, mobile device 105 receives SPS signals 111, 115, and 117 from positioning satellites 112, 116, and 118, respectively. The SPS signals may be, e.g., any Global Navigation Satellite System (GNSS) such as GPS, GLONASS, GAL, or BeiDou or some other local or regional system such as Indian Regional Navigation Satellite System (IRNSS), Quasi-Zenith Satellite System (QZSS), European Geostationary Navigation Overlay Service (EGNOS) or Wide Area Augmentation System (WAAS).

Typically, each of the SPS signals 111, 115, and 117 would include timing information relating to when the SPS signal was transmitted from the respective satellite. Each SPS signal may also include ephemeris information which can be used to determine the position of the satellite at the time the SPS signal is transmitted. Mobile device 105 is able to determine when it receives each of the SPS signals 111, 115, and 117. The transmission time and reception time of each SPS signal may be aligned on a common timing reference, such as a common clock, known to the mobile device 105. By taking the difference between the reception time and transmission time, mobile device 105 may compute the flight time associated with each SPS signal, for it to travel from the respective satellite to mobile device 105. The flight time can then be used to compute the distance between each satellite and mobile device, taking into account the speed of light. Once the distance between each satellite and the mobile device is found, multilateration may be used to compute the position of mobile device 105, based on the known position of each satellite and the distance between each satellite and mobile device 105. SPS signals may be further used for determining the velocity of the mobile device 105 and may be further used for determination of absolute time.

The SPS signals 111, 115, and 117 include carrier signals that are used to carry the timing information, e.g., the pseudorandom noise ranging codes, and any navigation messages, e.g., ephemeris information. The phase of the carrier signals may be measured at regular intervals once a lock on the SPS signals 111, 115, and 117 is achieved and used to determine the range between the mobile device 105 and each satellite 112, 116, and 118. Once the distance between each satellite and the mobile device is found, multilateration may be used to compute the position of mobile device 105, based on the known position of each satellite and the distance between each satellite and mobile device 105.

In addition to satellite-based positioning, another category of functions that may be performed by mobile device 105 relates to wireless communications. Wireless communications may serve as an important link in connecting mobile device 105 over private and/or public networks with other devices such as servers and other mobile devices. This may include communication over various types of wireless networks, including wireless local area networks (WLAN) and wireless wide area networks (WWAN), among others. Examples of WLANs may be different types of Wi-Fi networks, such as those implemented based on various 802.11 standards. FIG. 1 illustrates wireless communications between the mobile device 105 and a terrestrial base station 126, a satellite vehicle 122, and an access point 130. However, other examples of wireless communications may include peer-to-peer communications between mobile devices such as Wi-Fi Direct, Long-Term Evolution (LTE) Direct, or Proximity-based Services (ProSe) Direction Communication (PC5), etc. Examples of WWAN may include satellite communications, 5G NR, LTE, wideband code division multiple access (WCDMA), and the like. Additional examples of wireless communications may include near field communications (NFC), Bluetooth communications, etc.

As used herein, the terms "mobile device" and "base station" are not intended to be specific or otherwise limited to any particular Radio Access Technology (RAT), unless otherwise noted. In general, a mobile device may be any wireless communication device (e.g., a mobile phone, router, tablet computer, laptop computer, tracking device, wearable (e.g., smartwatch, glasses, augmented reality (AR)/virtual reality (VR) headset, etc.), semi-autonomous or autonomous ground vehicle (e.g., automobile, truck, motorcycle, bicycle, etc.), semi-autonomous or autonomous aerial vehicle (e.g., UAV or drone), Internet of Things (IoT) device, etc.) used by a user to communicate over a wireless communications network. A mobile device may be mobile or may (e.g., at certain times) be stationary, and may communicate with a Radio Access Network (RAN). As used herein, the term "mobile device" may be referred to interchangeably as an "user equipment," "access terminal" or "AT," a "client device," a "wireless device," a "subscriber device," a "subscriber terminal," a "subscriber station," a "user terminal" or UT, a "mobile terminal," a "mobile station," or variations thereof. Generally, mobile devices can communicate with a core network via a RAN or in some cases a communication satellite, and through the core network the mobile devices can be connected with external networks such as the Internet and with other mobile devices. Of course, other mechanisms of connecting to the core network and/or the Internet are also possible for the mobile devices, such as over wired access networks, wireless local area network (WLAN) networks (e.g., based on IEEE 802.11, etc.) and so on.

As illustrated in FIG. 1, the mobile device 105 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR), etc. For instance, mobile device 105 may transmit communication signals 125 on a wireless communication link to a base station 126 and a communication signal 129 to an access point 130 on a wireless communication link. The base station 126, for example, may be part of a Radio Access Technology (RAT) and may support LTE or 5G NR communications, and access point 130 may support IEEE 802.11 WiFi. FIG. 1 highlights the wireless signals transmitted from mobile device 105 (as opposed to wireless signals received by mobile device 105 ), because various embodiments address techniques to reduce interference caused by such transmitted signals, but it should be understood that communication signals may be both transmitted and received by the mobile device 105 via the wireless communication links.

The mobile device 105 may further or alternatively support wireless communications with a communication satellite 122. For example, the mobile device 105 may perform wireless communications by sending signals to and receiving signals from one or more communication satellites 122 via a wireless communication link 121. Mobile device 105 may transmit or receive communication signals on the wireless communication link 121 with communication satellite 122. It should be understood that the communication satellite 122 is separate from positioning satellites 112, 116, and 118 and is not part of the SPS. The communication satellite 122 may be part of a wireless communication network, such a 5G New Radio (NR) or some other wireless access type such as Code Division Multiple Access (CDMA). FIG. 1 highlights the wireless signal transmitted from mobile device 105 to the communication satellite 122 (as opposed to wireless signals received by mobile device 105), because various embodiments address techniques to reduce interference caused by such transmitted signals, but it should be understood that communication signals may be both transmitted and received by the mobile device 105 via the wireless communication link 121.

Figure 2:
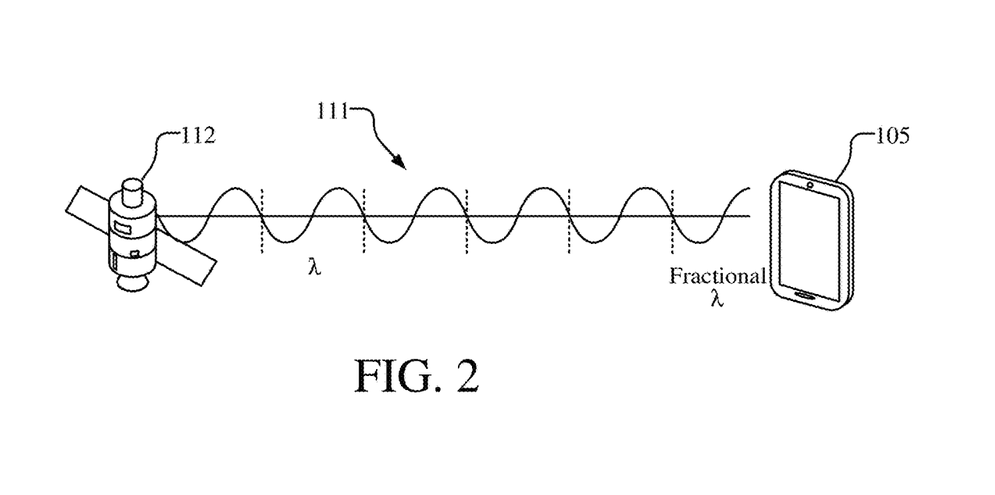
FIG. 2 illustrates carrier phase based ranging between the mobile device and satellite.

FIG. 2 illustrates carrier phase based ranging between the mobile device 105 and satellite 112. As illustrated, the SPS signal 111 includes a carrier signal, in the form of a continuous radio-frequency sinusoidal waveform. The carrier signal may carry the timing information, e.g., the pseudorandom noise ranging codes, and any navigation messages, e.g., ephemeris information.

Any distance D between the satellite 112 and the mobile device 105 may be represented in terms of N full wavelengths λ and the residual fractional wavelength of the carrier signals. In mathematical terms, the basic principle of estimating distance D using carrier phase may be given as follows:

$$D = N\lambda + \frac{\phi}{2\pi}\lambda \qquad \text{eq. 1}$$

A measurement of the phase of the carrier signal by the mobile device 105, provides only the fraction part of the wavelength λ as it is modulo-2π. Thus, the integer number N of full wavelengths λ is ambiguous and requires estimation via different cycle count techniques, such as double difference carrier-phase measurements or RTK, which are well known.

Once the integer ambiguity is resolved, the carrier phase may be tracked over time and the cycle counts continuously updated and used to determine the distance D to the satellite 112, as long as there is no interruption in the CP tracking. The tracked CP, however, may lose continuity for a variety of reasons, such as power management operations or blockage of the SPS signal. For example, the mobile device 105 may engage in active power management in which receiver circuits may be periodically powered down resulting in a discontinuous CP. In another example, the mobile device 105 may lose lock on the carrier of a positioning signal due to blockage of the SPS signal, e.g., the mobile device 105 may move to location with blockage conditions or may lose line of sight to the satellite.

Figure 3:
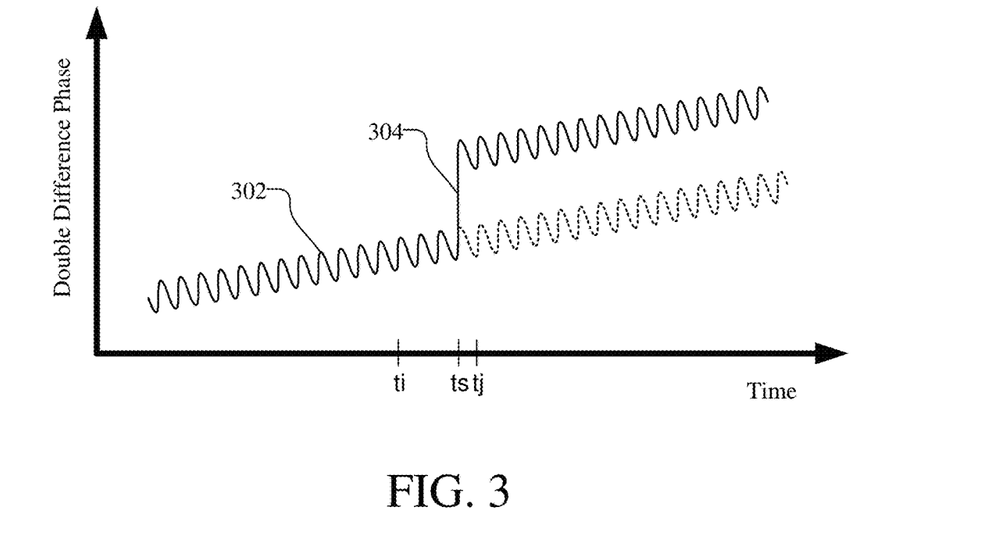
FIG. 3 illustrates an example of a double difference phase of a carrier signal measured by the mobile device over time.

FIG. 3, by way of example, illustrates an example of a double difference phase 302 of a carrier signal measured by the mobile device 105 over time. As illustrated, in FIG. 3, during a first time e.g., up to and including time ti, the carrier phase may be tracked. While the carrier phase of the carrier signal is tracked (and after the integer ambiguity is resolved), the mobile device 105 may determine a position estimate, e.g., using CP based positioning.

At a time ts, the phase 302 of the carrier signal suffers a cycle slip 304. The cycle slip 304 is a discontinuity in the phase lock of the mobile device 105 on the carrier signal from the satellite. The cycle slip 304 may be caused by, e.g., power loss (e.g., which may be due to power management cycle), a low signal-to-noise ratio, a failure of the receiver software, a malfunctioning satellite oscillator. The cycle slip 304 additionally may be caused by severe ionospheric conditions or obstructions such as buildings, trees, etc., that prevent the satellite signal from being tracked by the mobile device 105. After a cycle slip 304 occurs, the tracking of the carrier phase may resume, e.g. at time tj, but with a discontinuity with respect to the carrier phase prior to the cycle slip 304. A cycle slip 304 may be detected, e.g., based on the detection of the reset of the device's Phase Lock Loop, which generates the carrier phase measurement due to a power cycle or signal outage.

Coded pseudorange measurements do not suffer from integer cycle ambiguity and accordingly are not as affected by cycle slips as carrier phase measurements. Positioning accuracy suffers in carrier phase based measurements, on the other hand, if cycle slips are not detected and repaired to resolve the integer cycle ambiguity.

Figure 4:
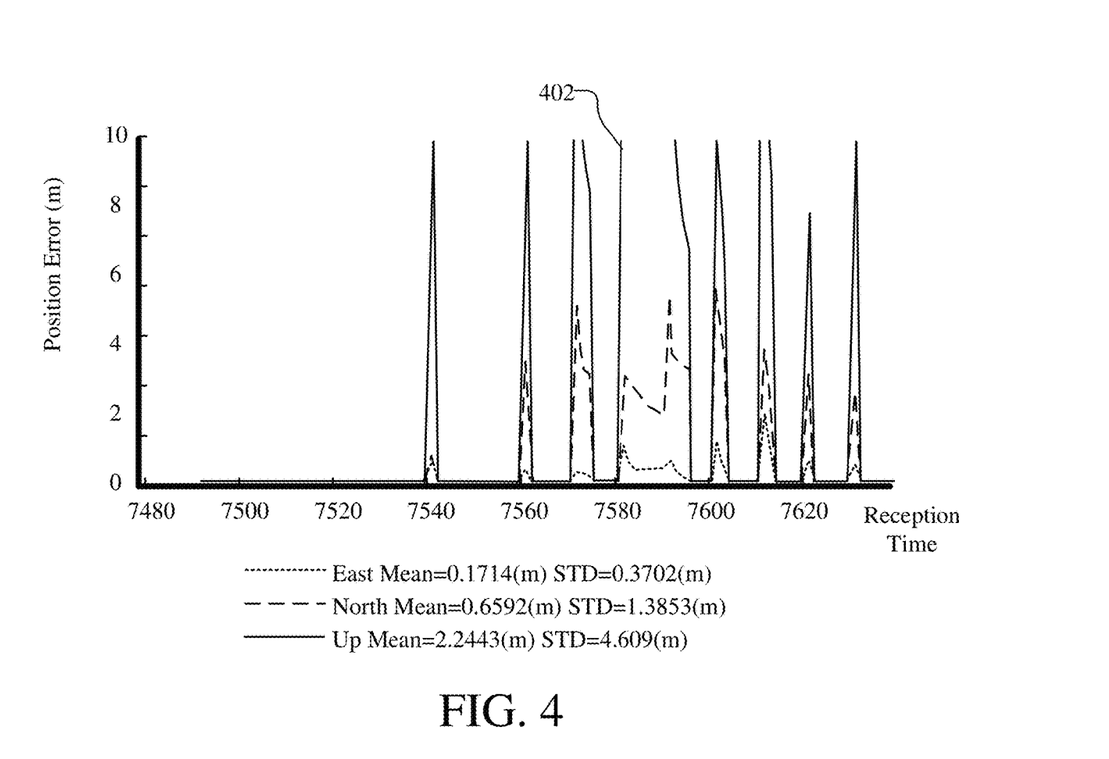
FIG. 4 illustrates an example of position error with respect to reception time for carrier phase based positioning using a Real Time Kinematics (RTK) process.

FIG. 4, by way of example, illustrates an example of position error with respect to reception time for carrier phase based positioning using RTK in which discontinuities in the measured carrier phase occur. Spikes in position error illustrated in FIG. 4 are due to discontinuities in the tracked carrier phase, e.g., due to reset of a number of ambiguity terms in the position engine (e.g., an extended Kalman filter). If there are only a few ambiguity terms that are reset, there is not a significant spike in position error. When a large number of SVs have cycle slip and all the ambiguities experience a reset, the positioning engine may be required to rely on pseudo-range measurement, which have a much lower accuracy that carrier phase based measurements, resulting in large position error spikes. When the reset ambiguities terms are re-fixed into an integer, the position accuracy will increase back to high accuracy, e.g. cm level accuracy. Thus, once a discontinuity in carrier phase occurs, particularly in a large number of SVs, the signals must be reacquired and tracked and the integer ambiguity re-fixed. As illustrated by spike 402, RTK may take up to 16 seconds to re-fix the integer ambiguity after a signal outage.

As discussed herein, the complications due to the integer ambiguity when a loss of lock on the carrier phase of a positioning signal may be minimized by using previous measurements by the mobile device 105 as a "virtual" base receiver to resolve the ambiguity. The use of the measurement history of the mobile device 105 as a virtual base receiver enables a positioning engine to output a continuous carrier phase, which may be used to determine the position of the mobile device 105, and may be advantageous in applications where low power mode (e.g., receiver power cycling) may be employed, for example, in in IoT devices, or on devices that may face signal outages. Additionally, the use of the measurement history of the mobile device 105 as a virtual base receiver may be used to enhance positioning techniques where base receivers are employed, such as RTK.

Figure 5:
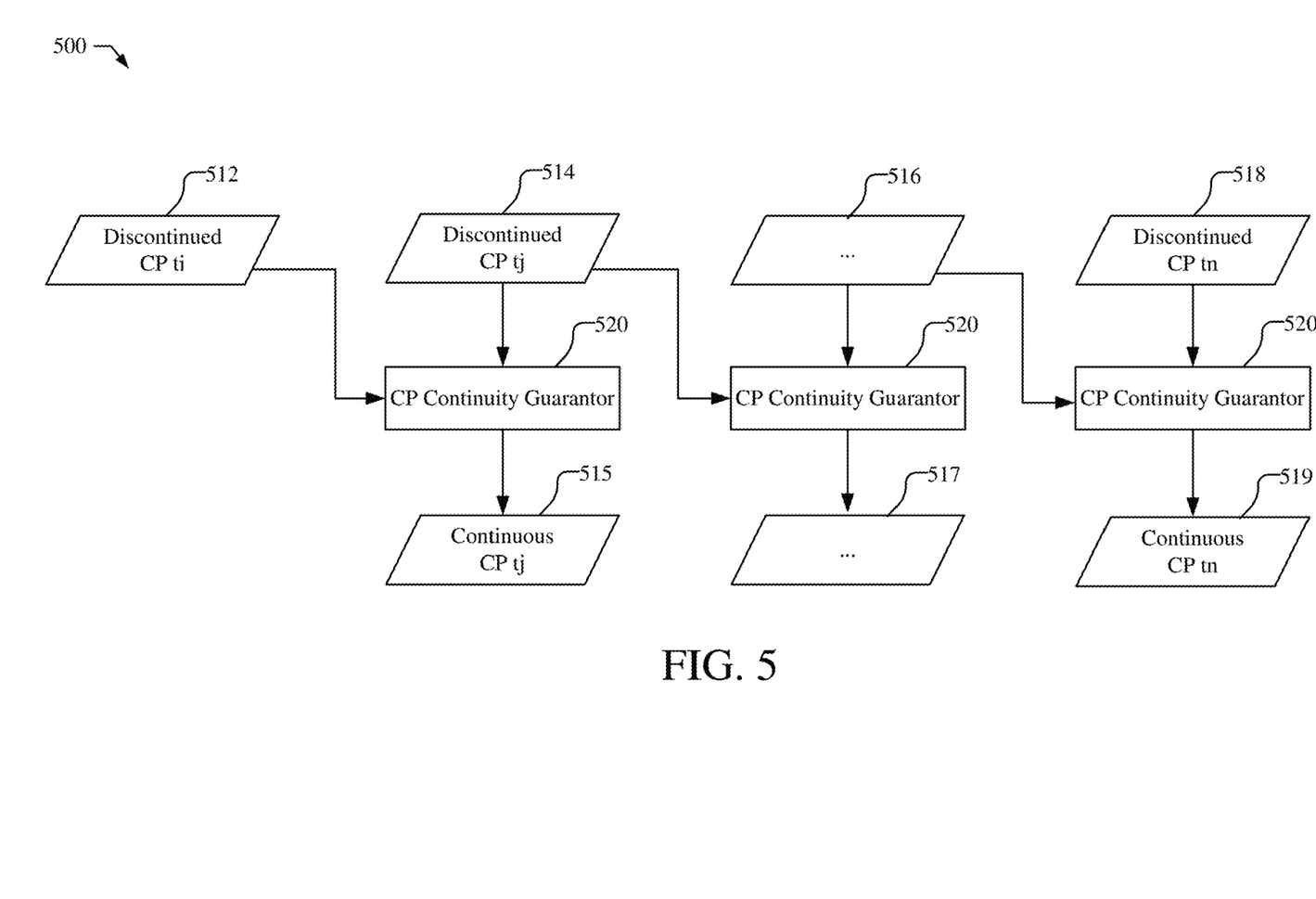
FIG. 5 illustrates a process of generating a continuous carrier phase signal using a carrier phase continuity engine.

FIG. 5, by way of example, illustrates a process 500 of generating a continuous carrier phase signal when a discontinuity in the carrier phase occurs. The carrier phase measurement of a positioning signal is acquired over time. While the carrier phase of the carrier signal is tracked, i.e., is continuous, (and after the integer ambiguity is resolved), the mobile device 105 may determine a position estimate, e.g., using CP based positioning.

Discontinuities in the carrier phase may occur, e.g., as illustrated by boxes 512, 514, 516, and 518. For example, a carrier phase may be measured at time ti, as illustrated by box 512, which may be discontinuous, i.e., there is a cycle slip compared to the carrier phase at time ti-1. Similarly, carrier phase may be measured at time tj, illustrated by box 514, which is discontinuous with respect to a carrier phase at time tj-1. Additionally carrier phase measurements may be made, which may be discontinuous with respect to preceding carrier phases, as represented by box 516, and a carrier phase may be measured at time tn, illustrated by box 518, which is discontinuous with respect to a carrier phase at time tn-1.

As illustrated, when a carrier phase discontinuity is detected, a continuous carrier phase may be determined using a CP continuity engine 520. The CP continuity engine 520, for example, may receive carrier phase information and position information from a previous time, e.g., from time ti, (which may be, e.g., several seconds earlier) and may receive the current discontinuous carrier phase information, e.g., from time tj, and may determine the current continuous carrier phase, e.g., for time tj, e.g., as illustrated by box 515. The CP continuity engine 520 may similarly determine a current continuous carrier phase 517 and 519 using carrier phase information and position information from previous times.

Figure 6:
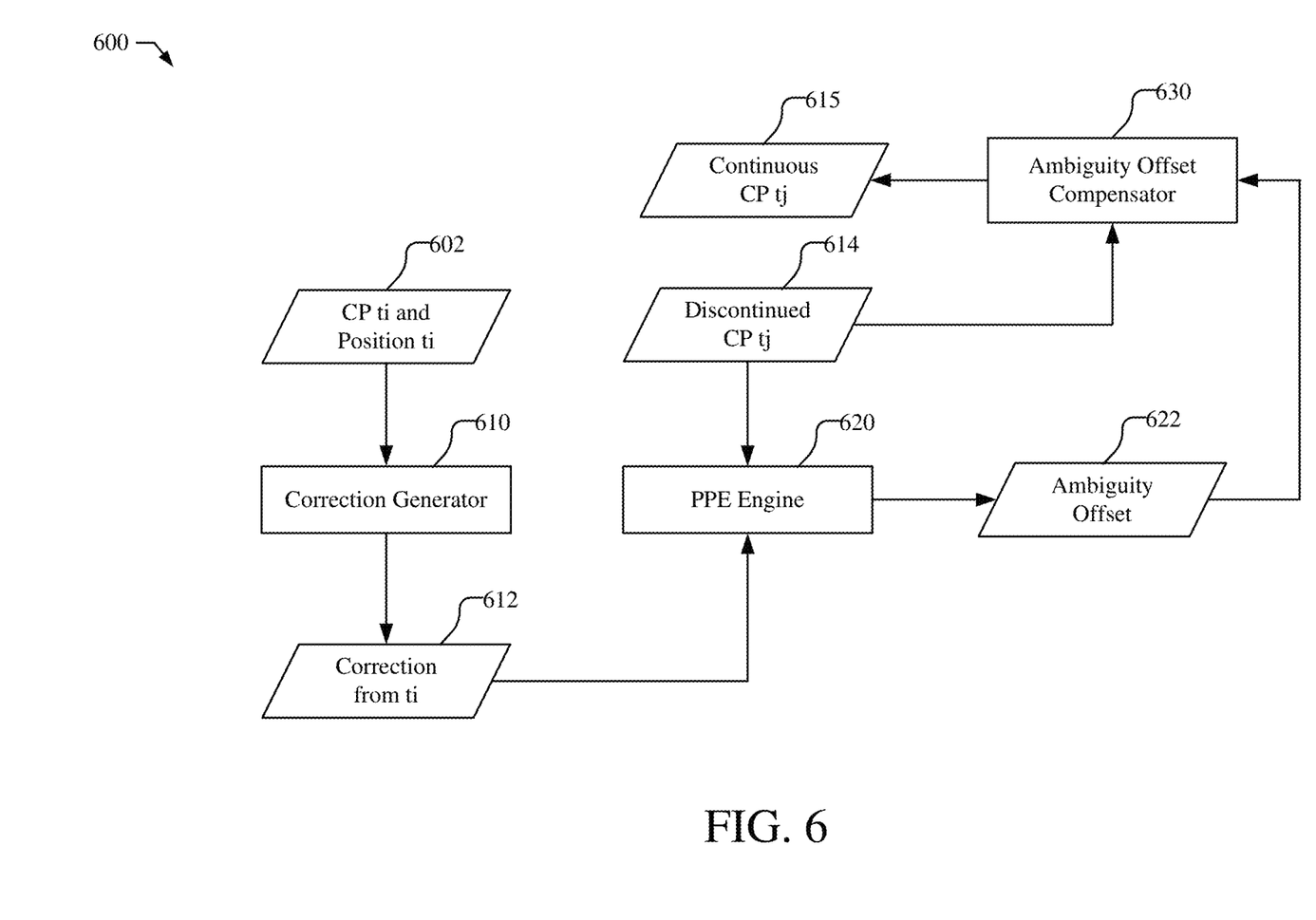
FIG. 6 is a block diagram illustrating certain exemplary aspects of the operation of a carrier phase continuity engine.

FIG. 6 is a block diagram illustrating certain exemplary aspects of the operation of a CP continuity engine 600, which may be used for the CP continuity engine 520 shown in FIG. 5. The CP continuity engine 600 generates a continuous carrier phase signal when a discontinuity in the carrier phase occurs, resolving an integer ambiguity in the carrier phase caused by cycle slips using a double-difference between a virtual base receiver at a previous time and the receiver at a current time.

As illustrated, CP continuity engine 600 includes a correction generator 610 that receives information 602 from a previous time, e.g., time ti. The information received by the correction generator 610, for example, includes the CP from the previous time ti, position information determined for the mobile device 105, which may be determined using the CP from time ti, and satellite position information. The correction generator 610 determines a base correction 612 from ti, using the measured distance between the mobile device 105 and the satellite at time ti, e.g., based on the measured CP at time ti, minus the computed geometry distance between the mobile device 105 and the satellite at time ti, based on the known position of the mobile device 105 at time ti, determined based on GNSS positioning, and the known satellite position at time ti. The base correction 612, for example, may be in the format of one float value for one signal type measurement, such as pseudo-range correction value and carrier phase correction value. The content of the correction may be a combined magnitude for many error sources, such as satellite orbit/clock, relativity effect, differential code bias, satellite phase wind-up, troposphere, ionosphere, site displacement including solid earth tide, ocean loading, pole tide, etc. The magnitude of each individual error source may not be known, but the combined magnitude for all error sources can be determined/estimated, and is provided in the correction 612.

The CP continuity engine 600, includes a Precise Positioning Engine (PPE) 620, which may include an Extended Kalman Filter (EKF), that receives as input data the base correction 612 from the correction generator 610, the measured pseudo-range measurements at time tj, as well as the discontinued CP from time tj 614 (which may be the same as the discontinuous CP at time tj 514 from FIG. 5). The PPE engine 620, for example, may be a positioning engine that performs carrier-phase RTK positioning. The PPE engine 620 may perform a double-difference to resolve an integer ambiguity in the carrier phase measured at time tj by performing a Kalman filter time update based on a dynamic model for the mobile device 105 position (x,y,z) at ti, then obtain a time updated position (x,y,z) at tj, and then performing a measurement update based on the pseudo-range measurements and carrier phase measurements from different satellites after applying the base correction 612 to the pseudo-range and carrier phase measurements at tj. The PPE engine 620, for example, may use a RTK process to generate an ambiguity offset 622.

An ambiguity offset compensator 630 receives the ambiguity offset 622 as input data from the PPE engine 620 as well as the discontinued CP from time tj 614 (which may be the same as the discontinued CP at time tj 514 from FIG. 5). The ambiguity offset compensator 630 uses the ambiguity offset 622 to generate the continuous CP at time tj 615 (which may be the same as the continuous CP at time tj 515 from FIG. 5). The ambiguity offset compensator 630, for example, may use RTK ambiguity offset process to produce the continuous CP at time tj 615. The continuous CP at time tj 615 may then be used for CP based positioning.

Thus, the CP continuity engine 600 for the mobile device 105 resolves the integer ambiguity in a discontinuous CP at time tj based the mobile device 105 history, including a known position of the mobile device 105 and CP from a previous time (time ti). The device history, thus, operates as a virtual base receiver that is analogous to a separate base receiver employed in positioning techniques such as RTK. The device history bridges the ambiguity offset between the current time (i.e., time of a discontinuous CP measurement at time tj) and a previous time (i.e., a previous measurement at time ti), to resolve the integer ambiguity and generate a continuous CP. The double-difference may be generated between the virtual base receiver at time ti and the mobile device at the current time tj first, then between satellites, to resolve the integer ambiguities. By enabling a continuous CP measurement without requiring externally available base receivers (such as used in RTK positioning), the mobile device 105 may successfully employ power management operations, e.g., periodically powering down one or more receiver circuits for receiving the positioning signals, without significantly impacting CP based positioning accuracy will little delay. Moreover, loss of CP tracking, e.g., due to blockage conditions, will negligible impact on CP based positioning accuracy or delay.

Table 1, below, by way of example, illustrates an example of the determined ambiguity offset (Amb offset) for multiple GNSS constellations from a CP continuity engine 600, with the correctness verified using Ground Truth (GT) at times ti and tj. In Table 1, Sys-ID provides IDs for GNSS constellations where 1 indicates as GPS, 2 for BDS, 3 for GAL, and Sig-ID provides IDs of signals where 1 is for GPS L1, BDS BII, GAL E1, and 2 for GPS L5, BDS B2A, GAL E5A, and PRN is similar to an SV identifier.

TABLE 1

| Sys-ID | Sig-ID | PRN | Amb offset |
|--------|--------|-----|------------|
| 1 | 2 | 10 | −9047.00 |
| 1 | 2 | 18 | −9253.00 |
| 1 | 2 | 23 | −9189.00 |
| 1 | 2 | 26 | −9225.00 |
| 3 | 1 | 2 | −12487.00 |
| 3 | 1 | 5 | −1115.00 |
| 3 | 1 | 9 | 39247.00 |
| 3 | 1 | 15 | 197818.00 |
| 3 | 1 | 30 | −164912.00 |
| 3 | 1 | 36 | −97368.00 |
| 3 | 2 | 2 | −9201.00 |
| 3 | 2 | 5 | −9186.00 |
| 3 | 2 | 9 | −9162.00 |
| 3 | 2 | 15 | −9210.00 |
| 3 | 2 | 30 | −9214.00 |
| 3 | 2 | 36 | −9225.00 |

Additionally, the CP continuity engine 600 in the mobile device 105 may be used to enhance RTK by enabling the use of a "virtual" base receiver (based on device history) as an additional correction source for RTK.

Figure 7:
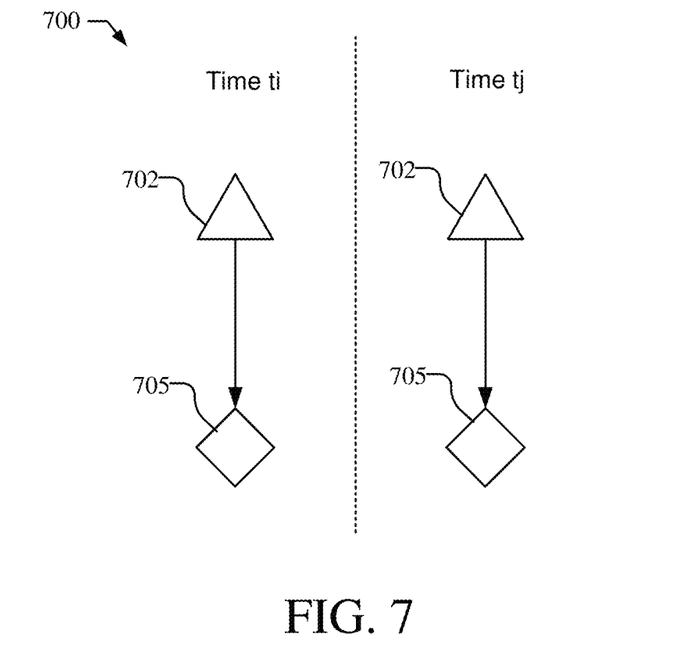
FIG. 7 is a block diagram illustrating a standard RTK process.

FIG. 7, by way of example, is a block diagram 700 illustrating a standard RTK process in which a mobile device 705 receives corrections from a single base receiver 702 at time ti and time tj. With the use of a single base receiver 702, the ambiguity re-fix time after loss of tracking of the CP, may be significant, e.g., as illustrated in FIG. 4.

Figure 8:
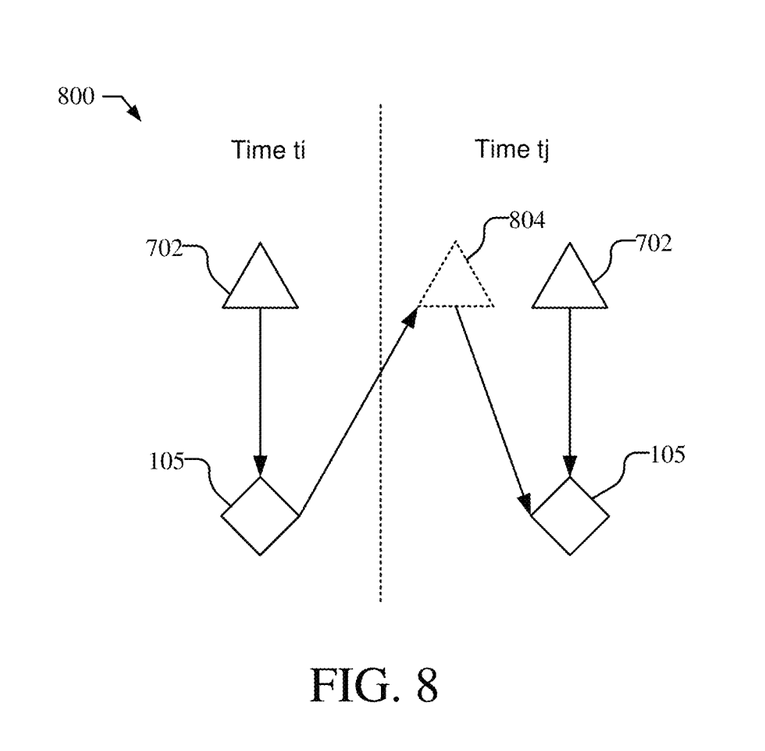
FIG. 8 is a block diagram illustrating an enhanced RTK process using a virtual base receiver.

FIG. 8, on the other hand, is a block diagram 800 illustrating an RTK process similar to that shown in FIG. 7, but includes the use of the device history (from time ti) from mobile device 105 as a "virtual" base receiver 804, along with the base receiver 702 at time tj. By enabling the additional correction from the mobile device 105 as a virtual base receiver 804, e.g., via the CP continuity engine 600 in the mobile device 105, the RTK process may be enhanced to improve RTK performance and reduce the ambiguity re-fix time. For example, the virtual base receiver 804 may provide better error cancellation performance than the base receiver 702, particularly when the base receiver 702 and the mobile device 105 are not physically close. Further, the base receiver 702 may not provide corrections for all satellite being tracked by the mobile device 105, e.g., due to use of different manufacture, model, technologies, etc. On the other hand, because the virtual base station 804 is generated from the device history of the mobile device, the virtual base station 804 will inherently provide corrections for all satellite being tracked by the mobile device 105.

Figure 9:
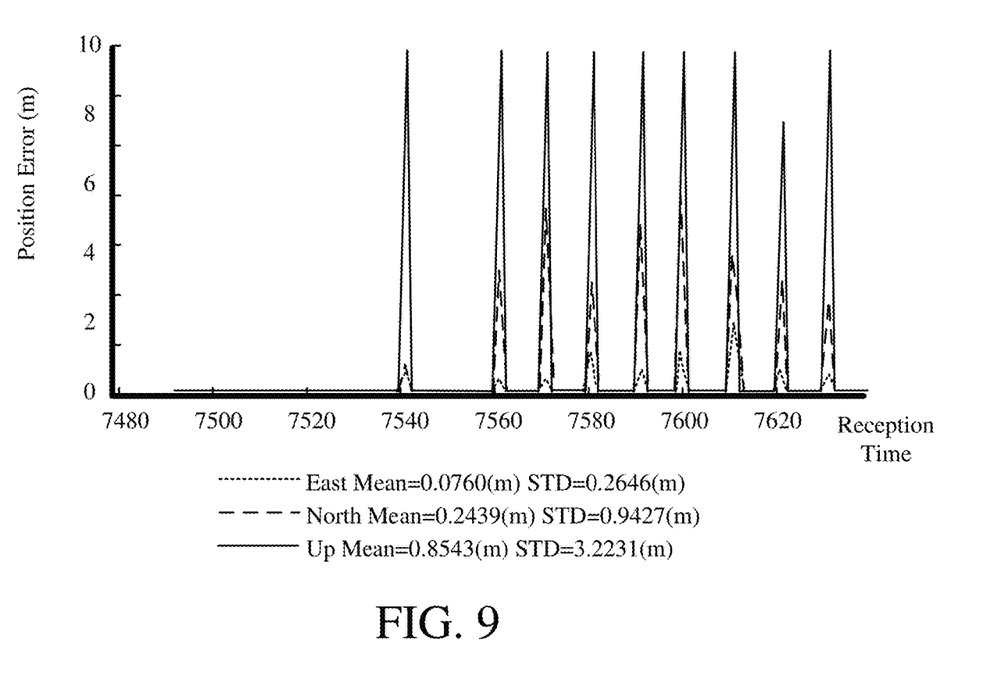
FIG. 9 illustrates an example of position error with respect to reception time for carrier phase based positioning using an enhanced RTK process as discussed herein.

FIG. 9, by way of example, illustrates an example of position error with respect to reception time for carrier phase based positioning using an enhanced RTK process, such as is illustrated in FIG. 8. The graph illustrated in FIG. 9 is similar to that illustrated in FIG. 4, in which discontinuities in the measured carrier phase occur and are corrected. In comparison to the ambiguity re-fix time for a standard RTK process, as illustrated in FIG. 4, FIG. 8 illustrates that with the use of an enhanced RTK process, in which a virtual base receiver based on the mobile device history is used in addition to a physical base receiver, the ambiguity re-fix time after loss of tracking of the CP may be significantly reduced.

Figure 10:
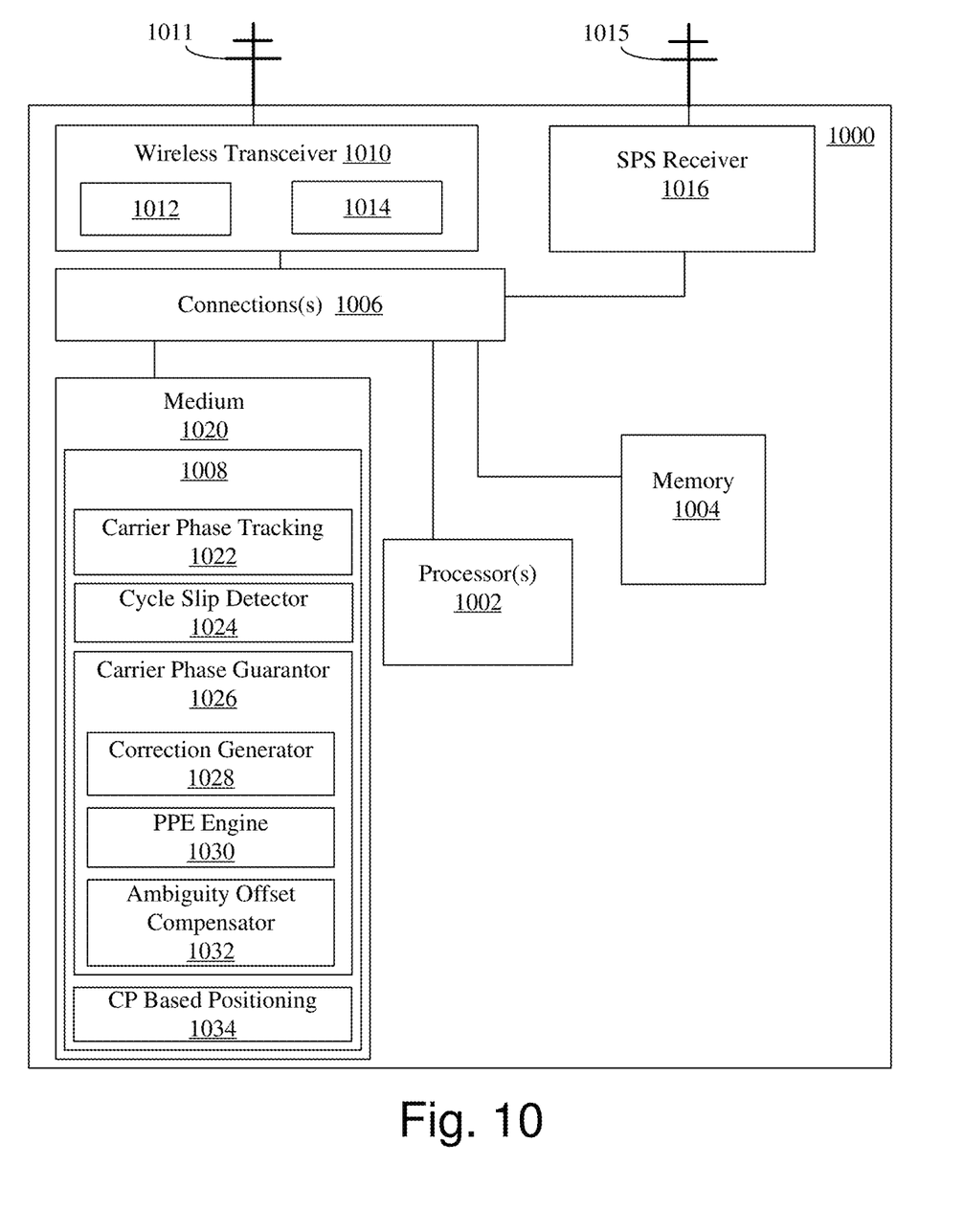
FIG. 10 shows a schematic block diagram illustrating certain exemplary features of a mobile device configured to support SPS operation as discussed herein.

FIG. 10 shows a schematic block diagram illustrating certain exemplary features of a mobile device 1000, e.g., which may be mobile device 105 shown in FIG. 1, configured to generate a continuous carrier phase signal for positioning signals when a discontinuity in the carrier phase occurs, according to the disclosure herein. Mobile device 1000 may be configured, for example, to implement the CP continuity engine 600 shown in FIG. 6, and to perform the process illustrated in FIG. 11 and supporting techniques and algorithms discussed herein. Mobile device 1000 may, for example, include one or more processors 1002, memory 1004, an external interface such as a wireless transceiver 1010, and an SPS receiver 1016, which may be operatively coupled with one or more connections 1006 (e.g., buses, lines, fibers, links, etc.) to non-transitory computer readable medium 1020 and memory 1004. The mobile device 1000 may further include additional items, which are not shown, such as a user interface that may include e.g., a display, a keypad or other input device, such as virtual keypad on the display, through which a user may interface with the mobile device, or a satellite positioning system receiver. In certain example implementations, all, or part of mobile device 1000 may take the form of a chipset, and/or the like. Wireless transceiver 1010 may, for example, include a transmitter 1012 enabled to transmit one or more signals over one or more types of wireless communication networks and a receiver 1014 to receive one or more signals transmitted over the one or more types of wireless communication networks, and may be configured for various communication protocols/standards, such as satellite communications, 5G NR, LTE, Wi-Fi, etc. The SPS receiver 1016 may receive SPS signals with multiple frequency bands and of various satellite position signaling standards, such as GPS, GLONASS, GAL, BDS, and/or other type of satellite positioning system. The SPS receiver 1016 may be configured to receive positioning signals from one or more positioning satellites and may include a measurement engine and a position engine, or one or more of the measurement engine and position engine may be implemented by the one or more processors 1002, e.g., implementing one or more instructions or program code 1008 on a non-transitory computer readable medium, such as medium 1020 and/or memory 1004, as described.

In some embodiments, mobile device 1000 may include one or more antennas 1011 and 1015, which may be internal or external. Antenna 1011 may be used to transmit and/or receive signals processed by wireless transceiver 1010. In some embodiments, mobile device antenna 1011 may be coupled to wireless transceiver 1010. In some embodiments, measurements of signals received (transmitted) by mobile device 1000 may be performed at the point of connection of the mobile device antenna 1011 and wireless transceiver 1010. For example, the measurement point of reference for received (transmitted) RF signal measurements may be an input (output) terminal of the receiver 1014 (transmitter 1012) and an output (input) terminal of the mobile device antenna 1011. In a mobile device 1000 with multiple mobile device antennas 1011 or antenna arrays, the antenna connector may be viewed as a virtual point representing the aggregate output (input) of multiple mobile device antennas. Antenna 1015 may be coupled to SPS receiver 1016 and may be used to receive SPS signals on multiple frequency bands. In some embodiments, measurements of SPS signals received by mobile device 1000 may be performed at the point of connection of the antenna 1015 and SPS receiver 1016.

The one or more processors 1002 may be implemented using a combination of hardware, firmware, and software. For example, the one or more processors 1002 may be configured to perform the functions discussed herein by implementing one or more instructions or program code 1008 on a non-transitory computer readable medium, such as medium 1020 and/or memory 1004. In some embodiments, the one or more processors 1002 may represent one or more circuits configurable to perform at least a portion of a data signal computing procedure or process related to the operation of mobile device 1000.

The medium 1020 and/or memory 1004 may store instructions or program code 1008 that contain executable code or software instructions that when executed by the one or more processors 1002 cause the one or more processors 1002 to operate as a special purpose computer programmed to perform the techniques disclosed herein. As illustrated in mobile device 1000, the medium 1020 and/or memory 1004 may include one or more components or modules that may be implemented by the one or more processors 1002 to perform the methodologies described herein. While the components or modules are illustrated as software in medium 1020 that is executable by the one or more processors 1002, it should be understood that the components or modules may be stored in memory 1004 or may be dedicated hardware either in the one or more processors 1002 or off the processors.

A number of software modules and data tables may reside in the medium 1020 and/or memory 1004 and be utilized by the one or more processors 1002 in order to manage both communications and the functionality described herein. It should be appreciated that the organization of the contents of the medium 1020 and/or memory 1004 as shown in mobile device 1000 is merely exemplary, and as such the functionality of the modules and/or data structures may be combined, separated, and/or be structured in different ways depending upon the implementation of the mobile device 1000.

The medium 1020 and/or memory 1004 may include a carrier phase tracking module 1022 that when implemented by the one or more processors 1002 configures the one or more processors 1002 to track the carrier phase of each positioning signal received from a plurality of satellites via the SPS receiver 1016, e.g., as discussed herein.

The medium 1020 and/or memory 1004 may include a cycle slip detector module 1024 that when implemented by the one or more processors 1002 configures the one or more processors 1002 to detect a cycle slip of the phase of the carrier signal. For example, in some implementations, the one or more processors 1002 may be configured to detect a cycle slip based on a power cycle of a tracking loop, e.g., in the carrier phase tracking, or based on a loss of tracking of the carrier phase, which may be due to blocked positioning signals.

The medium 1020 and/or memory 1004 may include a carrier phase continuity engine module 1026 that when implemented by the one or more processors 1002 configures the one or more processors 1002 to resolve an integer ambiguity in the carrier phase, after a cycle slip, using the device history, including a determine position and carrier phase, from an earlier time, which may be stored in memory 1004. The carrier phase continuity engine module 1026, for example, may configured the one or more processors 1002 to enable the use of the device history to be treated as a virtual base receiver for eDGNSS, RTK or PPP positioning. The one or more processors 1002 may be configured to determine a double difference between the carrier phase and position from a previous time with the carrier phase and position from a current time, e.g., after a cycle slip. The carrier phase continuity engine module 1026 may include a number of sub-modules.

The medium 1020 and/or memory 1004 may include, e.g., as part of the carrier phase continuity engine module 1026, a correction generator module 1028, that when implemented by the one or more processors 1002 configures the one or more processors 1002 to generate a carrier phase correction based on a measured position and carrier phase from a previous time, e.g., as discussed in FIG. 6.

The medium 1020 and/or memory 1004 may include, e.g., as part of the carrier phase continuity engine module 1026, a PPE engine module 1030, that when implemented by the one or more processors 1002 configures the one or more processors 1002 to generate an ambiguity offset based on a carrier phase correction for a previous time, and a carrier phase for a current time, e.g., after a cycle slip has been detected, e.g., as discussed in FIG. 6.

The medium 1020 and/or memory 1004 may include, e.g., as part of the carrier phase continuity engine module 1026, a ambiguity offset compensator module 1032, that when implemented by the one or more processors 1002 configures the one or more processors 1002 to generate a continuous carrier phase at a current time, e.g., after a cycle slip has been detected, based on an ambiguity offset and the discontinuous carrier phase for the current time.

The medium 1020 and/or memory 1004 may include a CP based positioning module 1034 that when implemented by the one or more processors 1002 configures the one or more processors 1002 to estimate a position of the mobile device based on the positioning signals received from the plurality of satellites via the SPS receiver 1016. For example, the one or more processors 1002 may be configured to perform CP based positioning using the carrier phase of the positioning signals to determine distances to a plurality of positioning satellites and to determine the position of the mobile device based on the distances and known positions from the satellites (e.g., received in the positioning signals) using multilateration. The one or more processors 1002 may be additionally or alternatively configured to perform eDNGSS, RTK, PPP, or other similar positioning techniques. For example, the one or more processors 1002 may be configured to receive corrections from a base receiver and to use the corrections along with measured positioning signals to determine the position of the mobile device.

The methodologies described herein may be implemented by various means depending upon the application. For example, these methodologies may be implemented in hardware, firmware, software, or any combination thereof. For a hardware implementation, the one or more processors 1002 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1020 or memory 1004 that is connected to and executed by the one or more processors 1002. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1008 on a non-transitory computer readable medium, such as medium 1020 and/or memory 1004. Examples include computer readable media encoded with a data structure and computer readable media encoded with a computer program code 1008. For example, the non-transitory computer readable medium including program code 1008 stored thereon may include program code 1008 to support generation of a continuous carrier phase, in a manner consistent with disclosed embodiments. Non-transitory computer readable medium 1020 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1008 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1020, instructions and/or data may be provided as signals on transmission media included in a communication apparatus. For example, a communication apparatus may include a wireless transceiver 1010 having signals indicative of instructions and data. The instructions and data are configured to cause one or more processors to implement the functions outlined in the claims. That is, the communication apparatus includes transmission media with signals indicative of information to perform disclosed functions.

Memory 1004 may represent any data storage mechanism. Memory 1004 may include, for example, a primary memory and/or a secondary memory. Primary memory may include, for example, a random access memory, read only memory, etc. While illustrated in this example as being separate from one or more processors 1002, it should be understood that all or part of a primary memory may be provided within or otherwise co-located/coupled with the one or more processors 1002. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1020. As such, in certain example implementations, the methods and/or apparatuses presented herein may take the form in whole or part of a computer readable medium 1020 that may include computer implementable program code 1008 stored thereon, which if executed by one or more processors 1002 may be operatively enabled to perform all or portions of the example operations as described herein. Computer readable medium 1020 may be a part of memory 1004.

Figure 11:
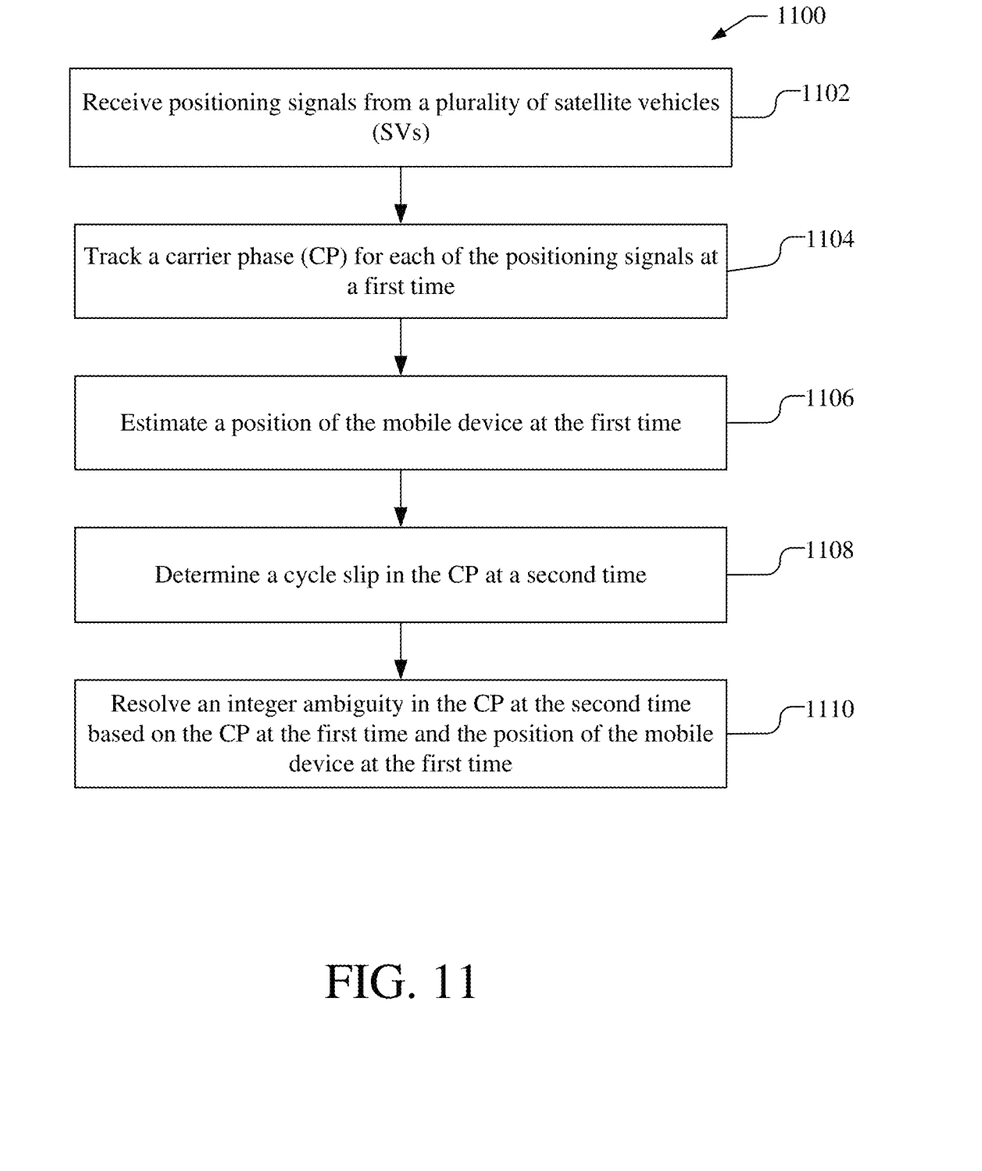
FIG. 11 is a flow chart illustrating a method for supporting satellite positioning system (SPS) operation performed by a mobile device, as discussed herein.

FIG. 11 is a flow chart illustrating a method 1100 for supporting satellite positioning system (SPS) operation performed by a mobile device, such as mobile device 105 or 1000, as described herein.

At block 1102, the mobile device may receive positioning signals from a plurality of satellite vehicles (SVs), as illustrated in FIG. 1. A means for receiving positioning signals from a plurality of satellite vehicles (SVs) may include the SPS receiver 1016, along with one or more processors 1002 with dedicated hardware or implementing executable code or software instructions in memory 1004 and/or medium 1020 in mobile device 1000 shown in FIG. 10.

At block 1104, the mobile device may track a carrier phase (CP) for each of the positioning signals at a first time, e.g., as illustrated in FIGS. 2 and 3. A means for tracking a carrier phase (CP) for each of the positioning signals at a first time may include the SPS receiver 1016, along with one or more processors 1002 with dedicated hardware or implementing executable code or software instructions in memory 1004 and/or medium 1020, including the carrier phase tracking module 1022 in mobile device 1000 shown in FIG. 10.

At block 1106, the mobile device may estimate a position of the mobile device at the first time, e.g., as discussed in reference to FIGS. 3 and 5. A means for estimating a position of the mobile device at the first time may include the SPS receiver 1016, along with one or more processors 1002 with dedicated hardware or implementing executable code or software instructions in memory 1004 and/or medium 1020, including the CP based positioning module 1034 in mobile device 1000 shown in FIG. 10.

At block 1108, the mobile device may determine a cycle slip in the CP at a second time, e.g., as discussed in reference to FIG. 3. In some implementations, the cycle slip in the CP at the second time may be determined based on a power cycle of a tracking loop, e.g., as discussed in FIG. 3. In some implementations, the cycle slip in the CP at the second time may be determined based on a loss of tracking of the CP due to blocked positioning signals, e.g., as discussed in FIG. 3. A means for determining a cycle slip in the CP at a second time may include the SPS receiver 1016, along with one or more processors 1002 with dedicated hardware or implementing executable code or software instructions in memory 1004 and/or medium 1020, including the cycle slip detector module 1024 in mobile device 1000 shown in FIG. 10.

At block 1110, the mobile device may resolve an integer ambiguity in the CP at the second time based on the CP at the first time and the position of the mobile device at the first time, e.g., as discussed in reference to FIGS. 5 and 6. In some implementations, the mobile device may resolve the integer ambiguity in the CP at the second time by determining a double difference between the CP at the first time and the position of the mobile device at the first time and the CP at the second time and the position of the mobile device at the second time, e.g., as discussed in reference to FIG. 6. A means for resolving an integer ambiguity in the CP at the second time based on the CP at the first time and the position of the mobile device at the first time may include the SPS receiver 1016, along with one or more processors 1002 with dedicated hardware or implementing executable code or software instructions in memory 1004 and/or medium 1020, including the carrier phase continuity engine module 1026 in mobile device 1000 shown in FIG. 10.

In some implementations, a previous cycle slip may occur between the first time and the second time, e.g., as discussed in reference to FIG. 5.

In some implementations, the mobile device may resolve the integer ambiguity in the CP at the second time by a generating a base correction from the first time based on the CP at the first time and the position of the mobile device at the first time, e.g., as discussed in FIG. 6. The mobile device may further generate an ambiguity offset based on the base correction, the position of the mobile device at the first time, an estimated position of the mobile device at the second time, and the CP at the second time, e.g., as discussed in FIG. 6. The mobile device may further generate a continuous CP at the second time based on the ambiguity offset and the CP at the second time, e.g., as discussed in FIG. 6. A means for generating a CP correction from the first time based on the CP at the first time may include the one or more processors 1002 with dedicated hardware or implementing executable code or software instructions in memory 1004 and/or medium 1020, including the correction generator module 1028 in mobile device 1000 shown in FIG. 10. A means for generating an ambiguity offset based on the CP correction, the position of the mobile device at the first time, an estimated position of the mobile device at the second time, and the CP at the second time may include the one or more processors 1002 with dedicated hardware or implementing executable code or software instructions in memory 1004 and/or medium 1020, including the PPE engine module 1030 in mobile device 1000 shown in FIG. 10. A means for generating a continuous CP at the second time based on the ambiguity offset and the CP at the second time may include the one or more processors 1002 with dedicated hardware or implementing executable code or software instructions in memory 1004 and/or medium 1020, including the ambiguity offset compensator module 1032 in mobile device 1000 shown in FIG. 10.

In some implementations, the mobile device may additionally receive a CP correction generated by a base receiver and may resolve the integer ambiguity in the CP at the second time further based on the CP correction generated by the base receiver, e.g., as discussed in FIGS. 6, 7, and 8. A means for receiving a CP correction generated by a base receiver may include the transceiver 1010, along with one or more processors 1002 with dedicated hardware or implementing executable code or software instructions in memory 1004 and/or medium 1020, including the CP based positioning module 1034 in mobile device 1000 shown in FIG. 10. A means for resolving the integer ambiguity in the CP at the second time further based on the CP correction generated by the base receiver may be, e.g., may include the SPS receiver 1016, along with one or more processors 1002 with dedicated hardware or implementing executable code or software instructions in memory 1004 and/or medium 1020, including the carrier phase continuity engine module 1026 in mobile device 1000 shown in FIG. 10.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

A satellite-based positioning system typically includes a system of transmitters positioned to enable entities to determine their position on or above the Earth based, at least in part, on signals received from the transmitters. Such a transmitter typically transmits a signal marked with a repeating pseudo-random noise (PN) code. In a particular example, such transmitters may be located on Earth orbiting space vehicles (SV). For example, an SV in a constellation of Global Navigation Satellite System (GNSS) such as Global Positioning System GPS, Global Navigation Satellite System (GLONASS), etc. may transmit a signal marked with a PN code that is distinguishable from PN codes transmitted by other SVs in the constellation.

In accordance with certain aspects, the techniques presented herein are not restricted to global systems (e.g., GNSS). For example, the techniques provided herein may be applied to or otherwise adapted for use in various regional systems, such as, e.g., Quasi-Zenith Satellite System (QZSS) over Japan, Indian Regional Navigational Satellite System (IRNSS) over India, etc., and/or various augmentation systems (e.g., a Satellite Based Augmentation System (SBAS)) that may be associated with or otherwise adapted for use with one or more global and/or regional navigation satellite systems. By way of example but not limitation, an SBAS may include an augmentation system(s) that provide integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Such SBAS may, for example, transmit GNSS and/or GNSS-like signals that may also be interfered with by certain wireless communication signals, etc. Thus, as used herein, an SPS may include any combination of one or more global and/or regional navigation satellite systems and/or augmentation systems.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

In view of this description embodiments may include different combinations of features. Implementation examples are described in the following numbered clauses.

Having described several example configurations, various modifications, alternative constructions, and equivalents may be used without departing from the spirit of the disclosure. For example, the above elements may be components of a larger system, wherein other rules may take precedence over or otherwise modify the present disclosure. Also, a number of steps may be undertaken before, during, or after the above elements are considered.

What is claimed is:

1. A method for supporting satellite positioning system (SPS) operation performed by a mobile device, the method comprising:
   receiving positioning signals from a plurality of satellite vehicles (SVs);
   tracking a carrier phase (CP) for each of the positioning signals at a first time;
   estimating a position of the mobile device at the first time;
   determining a cycle slip in the CP at a second time and a previous cycle slip in the CP at an intervening time, the intervening time corresponding to a time between the first time and the second time; and
   responsive to determining the cycle slip in the CP at the second time, resolving an integer ambiguity in the CP at the second time by:
     generating a carrier phase correction for the intervening time without a physical base receiver based at least in part on a virtual base receiver, which provides a position of the mobile device and the CP at the intervening time, wherein the virtual base receiver corresponds to the mobile device and stores a device history of at least one known position of the mobile device and CP before the second time;
     generating an ambiguity offset based at least in part on the carrier phase correction generated for the intervening time and the CP at the second time; and
     generating a continuous CP at the second time by applying the ambiguity offset to the cycle slip in the CP.

2. The method of claim 1, wherein resolving the integer ambiguity in the CP at the second time comprises determining a double difference between the CP at the first time and the position of the mobile device at the first time and the CP at the second time and the position of the mobile device at the second time.

3. The method of claim 1, wherein the cycle slip in the CP at the second time is determined based on a power cycle of a tracking loop.

4. The method of claim 1, wherein the cycle slip in the CP at the second time is determined based on a loss of tracking of the CP due to blocked positioning signals.

5. The method of claim 1, wherein the device history of the virtual base receiver is stored in a memory of the mobile device.

6. A mobile device configured for supporting satellite positioning system (SPS) operation, comprising:
   a wireless transceiver configured to wirelessly communicate with network entities;
   a satellite positioning system (SPS) receiver configured to wireless receive positioning signals from positioning satellites;
   at least one memory; and
   at least one processor coupled to the wireless transceiver, the SPS receiver, and the at least one memory, the at least one processor configured to:
     receive, via the SPS receiver, positioning signals from a plurality of satellite vehicles (SVs);
     track a carrier phase (CP) for each of the positioning signals at a first time;
     estimate a position of the mobile device at the first time;
     determine a cycle slip in the CP at a second time and a previous cycle slip in the CP at an intervening time, the intervening time corresponding to a time between the first time and the second time; and
     responsive to determining the cycle slip in the CP at the second time, resolve an integer ambiguity in the CP at the second time by:
       generating a carrier phase correction for the intervening time without a physical base receiver based at least in part on a virtual base receiver, which provides a position of the mobile device and the CP at the intervening time, wherein the virtual base receiver corresponds to the mobile device and stores a device history of at least one known position of the mobile device and CP before the second time;
       generating an ambiguity offset, based at least in part on the carrier phase correction generated for the intervening time and the CP at the second time; and
       generating a continuous CP at the second time by applying the ambiguity offset to the cycle slip in the CP.

7. The mobile device of claim 6, wherein the at least one processor is configured to resolve the integer ambiguity in the CP at the second time by being configured to determine a double difference between the CP at the first time and the position of the mobile device at the first time and the CP at the second time and the position of the mobile device at the second time.

8. The mobile device of claim 6, wherein the cycle slip in the CP at the second time is determined based on a power cycle of a tracking loop.

9. The mobile device of claim 6, wherein the cycle slip in the CP at the second time is determined based on a loss of tracking of the CP due to blocked positioning signals.

10. The mobile device of claim 6, wherein the device history of the virtual base receiver is stored in the memory of the mobile device.

11. A mobile device configured for supporting satellite positioning system (SPS) operation, comprising:
    means for receiving positioning signals from a plurality of satellite vehicles (SVs);
    means for tracking a carrier phase (CP) for each of the positioning signals at a first time;
    means for estimating a position of the mobile device at the first time;
    means for determining a cycle slip in the CP at a second time and a previous cycle slip in the CP at an intervening time, the intervening time corresponding to a time between the first time and the second time; and means for, responsive to determining the cycle slip in the CP at the second time, resolving an integer ambiguity in the CP at the second time using:
- means for generating a carrier phase correction for the intervening time without a physical base receiver based at least in part on a virtual base receiver, which provides a position of the mobile device and the CP at the intervening time, wherein the virtual base receiver corresponds to the mobile device and stores a device history of at least one known position of the mobile device and CP before the second time;
- means for generating an ambiguity offset, based at least in part on the carrier phase correction generated for the intervening time and the CP at the second time; and
- means generating a continuous CP at the second time by applying the ambiguity offset to the cycle slip in the CP.

12. The mobile device of claim 11, wherein the means for resolving the integer ambiguity in the CP at the second time comprises means for determining a double difference between the CP at the first time and the position of the mobile device at the first time and the CP at the second time and the position of the mobile device at the second time.

13. The mobile device of claim 11, wherein the cycle slip in the CP at the second time is determined based on a power cycle of a tracking loop.

14. The mobile device of claim 11, wherein the cycle slip in the CP at the second time is determined based on a loss of tracking of the CP due to blocked positioning signals.

15. The mobile device of claim 11, wherein the device history of the virtual base receiver is stored in a memory of the mobile device.

16. A non-transitory storage medium including program code stored thereon, the program code is operable to configure at least one processor in a mobile device for supporting satellite positioning system (SPS) operation, the program code comprising instructions to:
- receive positioning signals from a plurality of satellite vehicles (SVs);
- track a carrier phase (CP) for each of the positioning signals at a first time;
- estimate a position of the mobile device at the first time;
- determine a cycle slip in the CP at a second time and a previous cycle slip in the CP at an intervening time, the intervening time corresponding to a time between the first time and the second time; and
- responsive to determining the cycle slip in the CP at the second time, resolve an integer ambiguity in the CP at the second time by:
  - generating a carrier phase correction for the intervening time without a physical base receiver based at least in part on a virtual base receiver, which provides a position of the mobile device and the CP at the intervening time, wherein the virtual base receiver corresponds to the mobile device and stores a device history of at least one known position of the mobile device and CP before the second time;
  - generating an ambiguity offset based at least in part on the carrier phase correction generated for the intervening time and the CP at the second time; and
  - generating a continuous CP at the second time by applying the ambiguity offset to the cycle slip in the CP.

17. The non-transitory storage medium of claim 16, wherein the instructions to resolve the integer ambiguity in the CP at the second time include instructions to determine a double difference between the CP at the first time and the position of the mobile device at the first time and the CP at the second time and the position of the mobile device at the second time.

18. The non-transitory storage medium of claim 16, wherein the cycle slip in the CP at the second time is determined based on a power cycle of a tracking loop.

19. The non-transitory storage medium of claim 16, wherein the cycle slip in the CP at the second time is determined based on a loss of tracking of the CP due to blocked positioning signals.

20. The non-transitory storage medium of claim 16, wherein the device history of the virtual base receiver is stored in a memory of the mobile device.

* * * * *